(12) United States Patent
Barger et al.

(10) Patent No.: US 8,192,539 B2
(45) Date of Patent: Jun. 5, 2012

(54) MIXTURES OF ZEOLITE AND RAP/RAS

(75) Inventors: Scott Barger, DeSoto, KS (US); Armando Sotelo, The Woodlands, TX (US); Daniel Micco, Georgetown, IN (US); Flavio Ernesto Ribeiro, Plainfield, IL (US)

(73) Assignee: PQ Corporation, Malvern, PA (US)

( * ) Notice: Subject to any disclaimer, the term of this patent is extended or adjusted under 35 U.S.C. 154(b) by 0 days.

(21) Appl. No.: 13/111,607

(22) Filed: May 19, 2011

(65) Prior Publication Data

US 2011/0283920 A1   Nov. 24, 2011

Related U.S. Application Data

(60) Provisional application No. 61/346,136, filed on May 19, 2010.

(51) Int. Cl.
*C08L 95/00* (2006.01)
*C09D 195/00* (2006.01)
*C10C 3/00* (2006.01)
*C08K 7/00* (2006.01)

(52) U.S. Cl. ............. 106/281.1; 106/273.1; 106/282; 106/283

(58) Field of Classification Search ........... 106/273.1, 106/281.1, 282, 283
See application file for complete search history.

(56) References Cited

U.S. PATENT DOCUMENTS

| 4,371,400 | A | 2/1983 | Müller et al. |
| 5,938,130 | A | 8/1999 | Zickell |
| 6,039,914 | A | 3/2000 | Gehrke et al. |
| 2006/0198698 | A1 | 9/2006 | Hall et al. |
| 2008/0060551 | A1 | 3/2008 | Crews et al. |
| 2010/0064937 | A1 | 3/2010 | Harmon et al. |

FOREIGN PATENT DOCUMENTS

JP   2005-16268 A  *  1/2005

OTHER PUBLICATIONS

Hurley et al, "Evaluation of Aspha-Min Zeolite for Use in Warm Mix Asphalt", NCAT Report 05-04, Jun. 2005, pp. 1-30.*
International Search Report for PCT/US2011/037186 dated Sep. 8, 2011 (Form PCT/ISA/210).
Written Opinion of the International Searching Authority dated Sep. 8, 2011 (Form PCT/ISA/237).

* cited by examiner

*Primary Examiner* — Anthony J Green
(74) *Attorney, Agent, or Firm* — Buchanan Ingersoll & Rooney PC

(57) ABSTRACT

Embodiments of the invention provide method for preparing mixtures of natural or artificial zeolite with at least one of recycled asphalt shingles and recycled asphalt pavement. The prepared mixtures are also within the scope of the invention. Mixtures prepared as described herein may be useful, for example, for mixture with hot mix asphalt and cold patch asphalt.

17 Claims, 4 Drawing Sheets

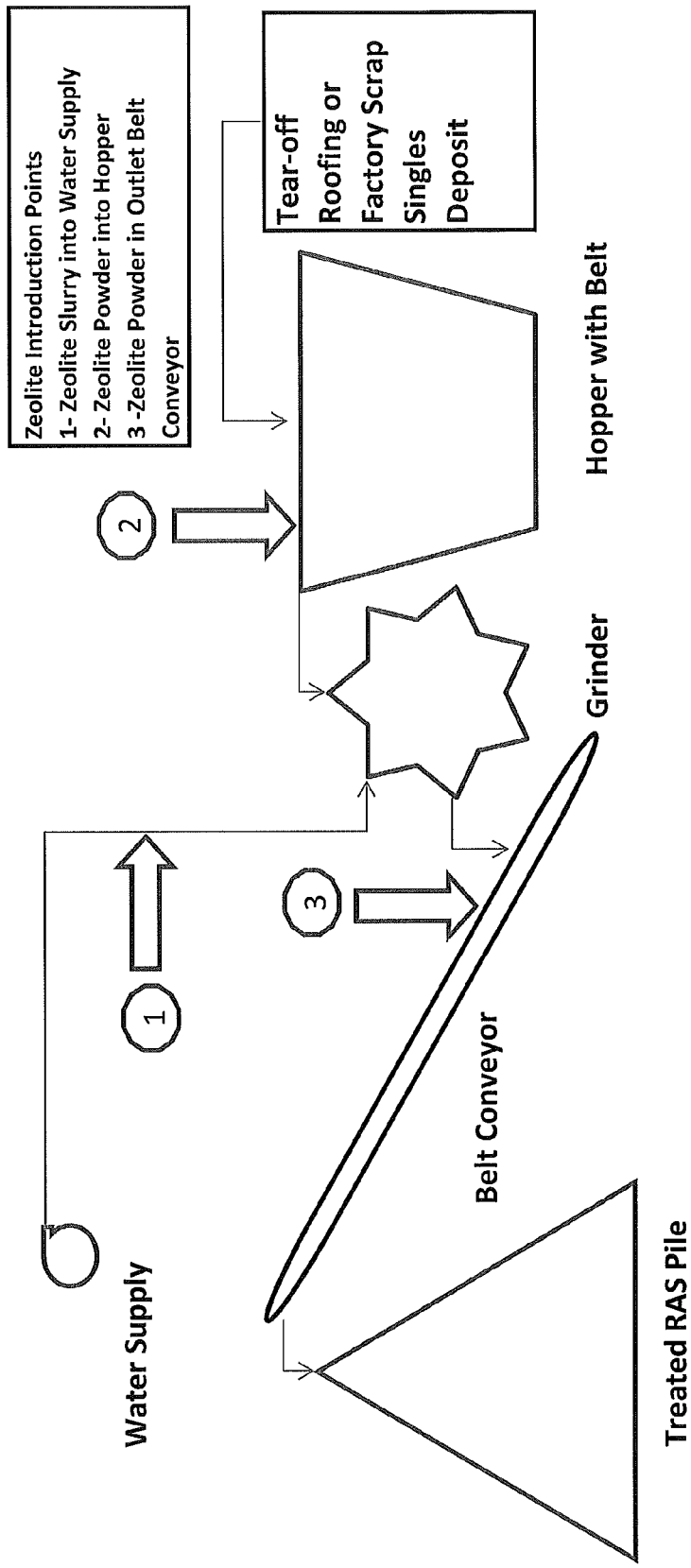

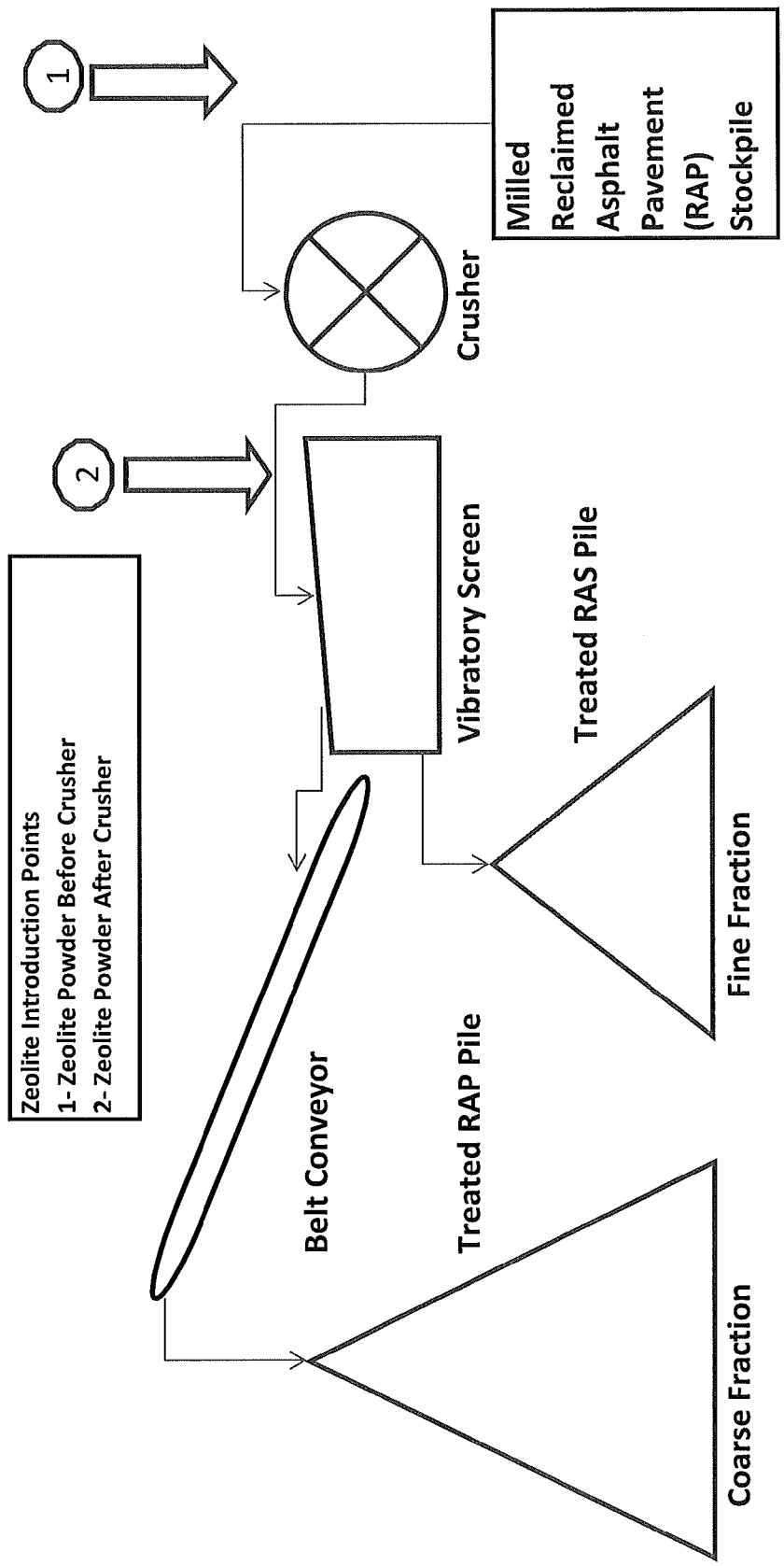
Fig 2 - Introduction of Zeolite into the RAP Processing Plant

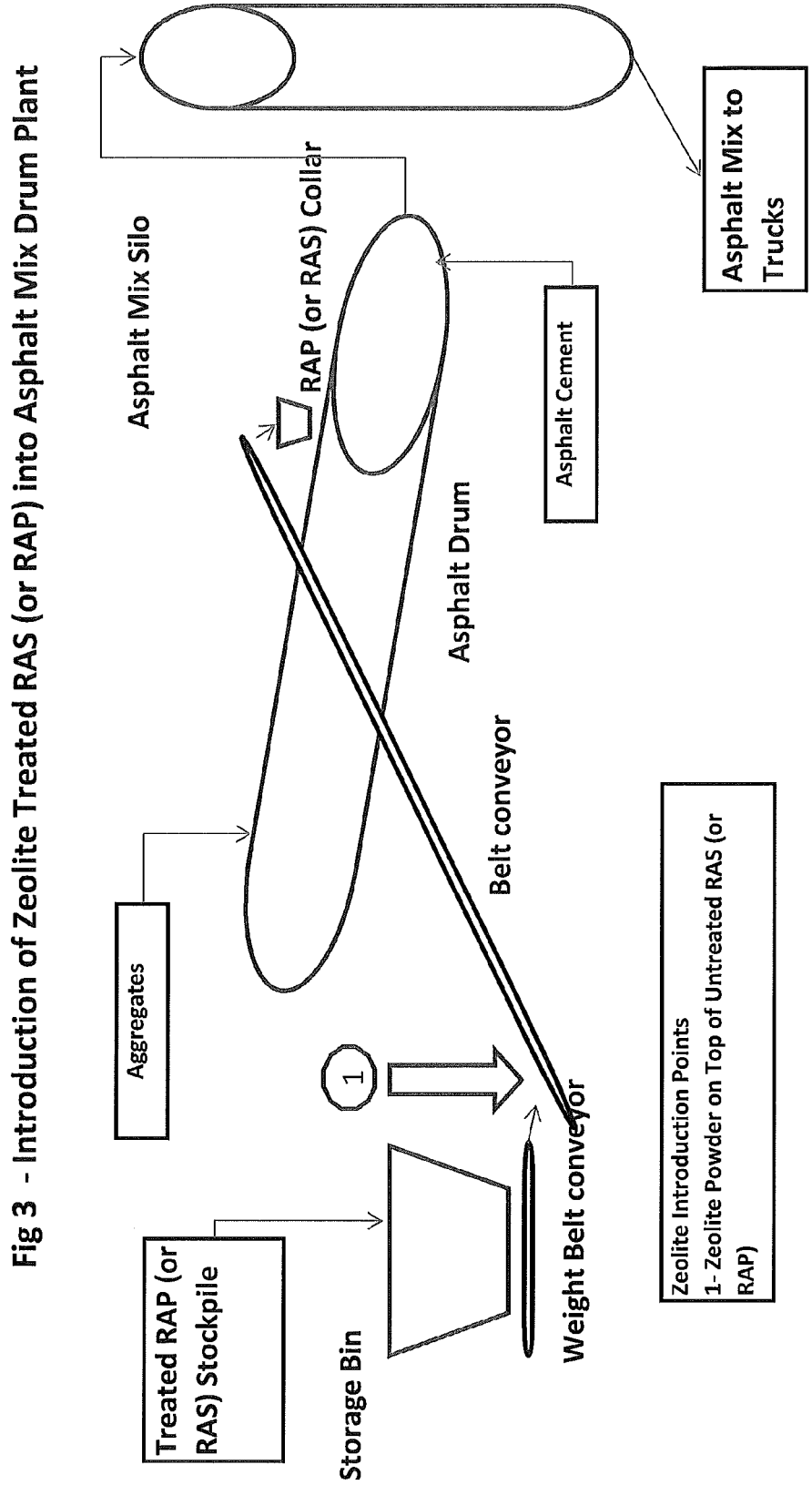
Fig 3 - Introduction of Zeolite Treated RAS (or RAP) into Asphalt Mix Drum Plant

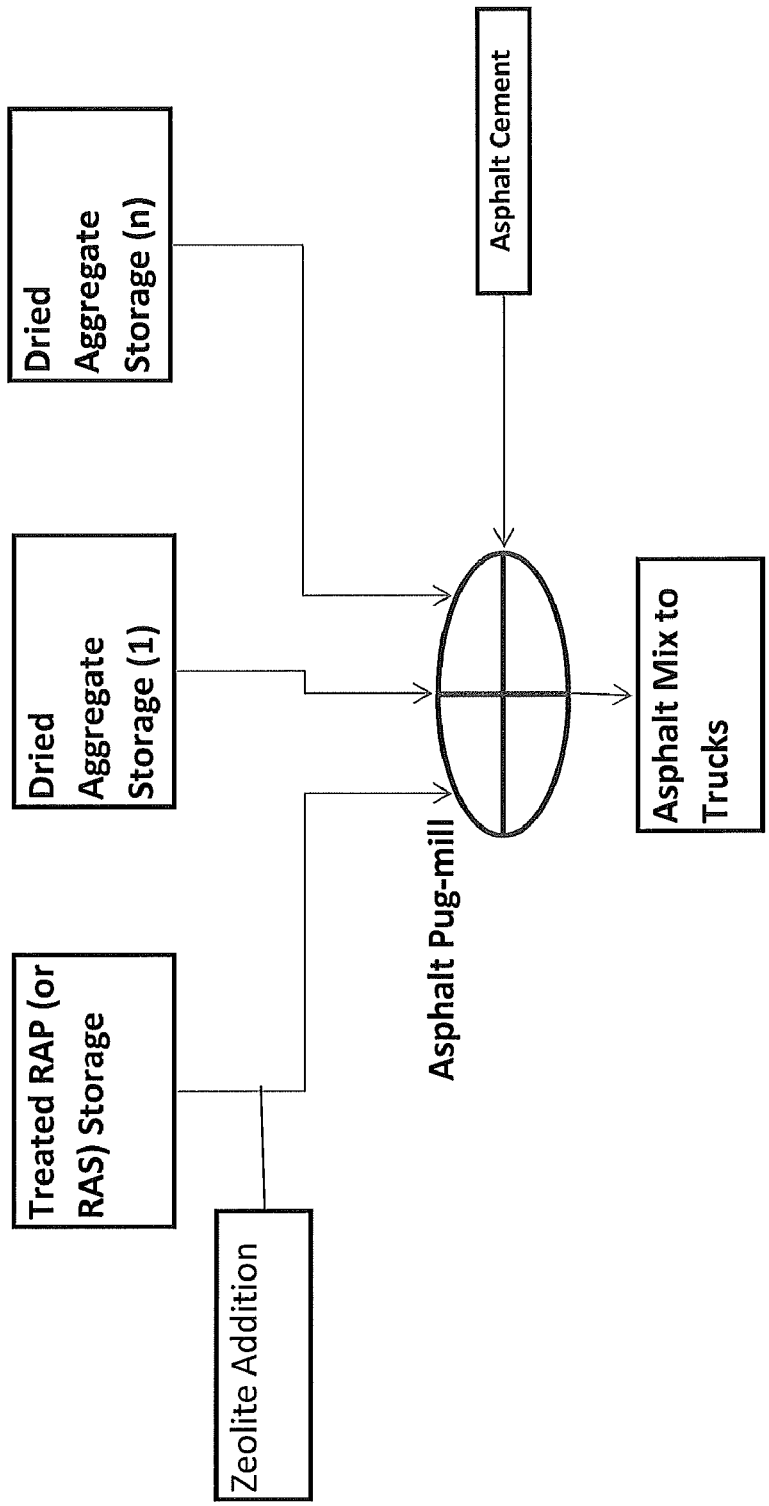
Fig 4 - Introduction of Zeolite Treated RAS (or RAP) into Asphalt Mix Batch Plant

MIXTURES OF ZEOLITE AND RAP/RAS

CROSS-REFERENCE TO RELATED APPLICATIONS

This application claims priority to U.S. Provisional Patent Application No. 61/346,136, filed on May 19, 2010. That application is incorporated by reference here.

BACKGROUND OF THE INVENTION

1. Field of the Invention

Embodiments of the invention relate to methods and compositions for mixture of zeolite with reclaimed asphalt pavement ("RAP") and/or recycled asphalt shingles ("RAS") prior to use of the RAP or RAS in asphalt mixtures.

2. Description of the Related Art

RAP is a removed or reprocessed pavement material that contains asphalt cement and aggregates. RAP may be incorporated into asphalt paving using hot or cold recycling. It may also be used as an aggregate when constructing a base or sub base.

Asphalt shingles make up a significant portion of the residential roofing market in the United States. RAS can be made up of either virgin off-spec shingles from the manufacturer or from tear-offs (used shingles removed from service on roofs). Whether virgin or used the shingles are typically ground (milled) to a small particle for use in an asphalt mix plant. When removed and used as RAS, these shingles may be ground and mixed with both hot-mix asphalt and cold-patch asphalt. RAS and RAP mixtures provided to asphalt mix plants may have some disadvantages. For example, they may present storage issues because of their tendency to absorb water. The water absorption process may lead to the formation of clumps or agglomerates, resulting in poor mixing with raw aggregates and asphalt cement. There is also a weight percentage of the total mix limit that the mix plant can add RAP or RAS into their process, either determined by the temperature of raw aggregate or the stiffness of the mix caused by the recycled asphalt cement.

BRIEF SUMMARY OF THE INVENTION

We want to provide RAS and RAP mixtures to asphalt production plants in a form that is suitable for effective long-term storage while the mixtures are exposed to the elements. It would also be desirable to provide RAS and RAP mixtures that more effectively mix with virgin aggregates and asphalt cement. We also want to provide RAS and RAP mixtures with an additive that would enable processing temperatures in the asphalt production plant to be reduced. Furthermore, we would like to provide RAS and RAP mixtures with an additive that would allow the use of higher quantities of these recycled materials in the asphalt production plant.

We have found that a more beneficial use of RAS and RAP may be made when the RAS and RAP are processed and mixed with a zeolite before introduction into the asphalt mix in either a batch or drum mix plant. This has a number of heretofore unforeseen advantages. For example, it allows better long-term storage of the RAS or RAP when it is exposed to the elements, since the pre-mixed zeolite is able to absorb some amount of water and act as a type of anti-block material and prevent portions of the RAP or RAS from clumping or agglomerating. Premixture also allows an asphalt mix plant to reduce processing temperatures by approximately 70° F. (39° C.), because of the beneficial effects of micro steam bubbles released from the zeolite structure and their subsequent lubrication of asphalt cement prior to coating the virgin aggregates.

Premixture also allows the mix plant to increase percentages of recycled RAP or RAS in the asphalt mix while running lower temperatures, improving the workability of the asphalt mix. Mixture of zeolite with RAP or RAS prior to mixture of the RAP or RAS with new asphalt will also allow one RAP or RAS processing facility to service multiple asphalt plants. This leads to potentially significant environmental and financial advantages.

We have found that an alternative and more economical method of delivering the zeolite to the asphalt production process can be achieved by blending with RAS and or RAP. When added in sufficient quantities to allow the zeolite to be introduced through the typical storage bin, weight cell conveyors typically used for addition of RAP or RAS in the asphalt mix plants the need for a specific feeding equipment for zeolite is eliminated. This leads to significant savings on capital investment required by the asphalt mix plants to introduce zeolite on their process. Embodiments of the invention may also permit introduction of the zeolite with traditional feeding equipment rather than specialized equipment.

One embodiment of the invention provides an asphalt mix additive including a zeolite in an amount between 0.01% and 0.5% by weight per ton of asphalt mix, as well as recycled asphalt shingles in an amount between 0.5% and 50% by weight per ton of asphalt mix. Another embodiment provides an asphalt mix additive including a zeolite, recycled asphalt shingles, and sand. A further embodiment provides an asphalt mix additive including zeolite in an amount between 0.01% and 0.5% per ton of asphalt mix and reclaimed asphalt pavement in an amount between 5% and 90% by weight per ton of asphalt of asphalt mix.

BRIEF DESCRIPTION OF THE FIGURES

FIG. 1 shows the introduction of zeolite into a RAS grinder.

FIG. 2 shows the introduction of zeolite into a RAP processing plant.

FIG. 3 shows the introduction of zeolite-treated RAS (or RAP) into an asphalt drum mix plant.

FIG. 4 shows introduction of zeolite-treated RAS (or RAP) into an asphalt mix batch plant.

DETAILED DESCRIPTION OF THE INVENTION

Aspects of the invention may be better understood by reference to specific embodiments as set forth in the examples below.

Recycled asphalt shingles, or "RAS," are usually though not exclusively recycled asphalt-containing residential shingles. Typical RAS may be organic shingles or fiberglass shingles with the following compositions:

Shingle Composition (RAS) by Weight

| Component | Organic Shingles | Fiberglass Shingles |
|---|---|---|
| Asphalt | 30-35% | 15-20% |
| Felt | 5-15% | 5-15% |
| Mineral Filler | 10-20% | 15-20% |
| Mineral Granules | 30-50% | 30-50% |

Mixtures of organic and fiberglass shingles may also be used. Mineral fillers are typically but not limited to fine graded limestone, silica and dolomite. Mineral granules are typically but are not limited to ceramic coated natural rock, sand-sized or coal slag.

Although shingles eventually used for RAS may be made in a number of ways, one process begins with a layer of organic (cellulose or wood fiber) or fiberglass backing felt. The felt is impregnated with liquid asphalt, and then coated on both sides with additional asphalt. The asphalt used as the saturant is of a different type; typically it is a modified asphalt-based adhesive. In one embodiment a typical new residential asphalt shingle, for example, one made by Owens Corning®, will include 32% to 42% Coating filler (limestone or fly ash), 28% to 42% Granules (painted rocks & coal slag), 16% to 25% Asphalt cement, 3% to 6% Back dust (limestone or silica sand), 2% to 15% Mat (fiberglass, paper, cotton rags), and 0.2% to 2% adhesives. Additional information on suitable shingles may be found, for example, in "Recycled Shingles in Road Applications" 1999, from the Vermont Agency of Natural Resources. That document is incorporated by reference herein.

Although the asphalt saturant is typically different from the asphalt used as the coating, both are harder than asphalt generally used in pavement. Both types of asphalt are "air-blown," or bubbled, during production. That process incorporates oxygen into the asphalt and further increases the viscosity. Powdered limestone (70% passing the No. 200 sieve) is also added to both types of asphalt as a stabilizer.

Once coated with the appropriate thickness of asphalt, one side of the shingle is then surfaced with granules for protection against physical damage and damage from ultraviolet rays of the sun. The granules, which are exposed in the roofing application, are comprised of crushed rock coated with ceramic metal oxides. The headlap granules are coal slag. Both types of aggregate are relatively uniform in size, most ranging from 0.3-2.36 mm, and both are hard and angular. Finally, a light coating of fine sand (<0.425 mm) is applied to the back surface to prevent the individual shingles from adhering to each other during packaging and transport.

Reclaimed asphalt pavement, or "RAP," is a reprocessed aggregate/asphalt composition generated by removal of asphalt pavement. Mineral aggregates constitute the overwhelming majority (93 to 97 percent by weight) of most RAP. Only a minor percentage (3 to 7 percent by weight) of RAP is hardened asphalt cement. Consequently, the overall chemical composition of RAP is essentially similar to that of the naturally occurring aggregate that is its principal constituent.

Asphalt cement, also known as bitumen, or asphalt binder, is made up of primarily high molecular weight aliphatic hydrocarbon compounds, but also small concentrations of other materials such as sulfur, nitrogen, and polycyclic hydrocarbons (aromatic and/or naphthenic) of very low chemical reactivity. Asphalt cement is a combination of asphaltenes and maltenes. Maltenes are typically present as resins and oils. Asphaltenes are more viscous than either resins or oils and play a major role in determining asphalt viscosity. Oxidation of aged asphalt causes the oils to convert to resins and the resins to convert to asphaltenes, resulting in age hardening and a higher viscosity binder. For this reason RAP may be higher in asphaltenes than similarly sourced new asphalt. In U.S. and Polish terminology, asphalt (or asphalt cement) is the carefully refined residue from the distillation process of selected crude oils. Outside these countries, the product is often called bitumen.

Zeolites are microporous crystalline solids with well-defined structures. Generally they contain silicon, aluminum and oxygen in their framework and cations (such as $Na^+$, $K^+$, $Ca^{2+}$, $Mg^{2+}$ and others), water and/or other molecules within their pores. These positive ions are rather loosely held and can readily be exchanged for others in a contact solution. Many occur naturally as minerals, and are extensively mined in many parts of the world. Others are synthetic, and are made commercially for specific uses. An example mineral formula is: $Na_2Al_2Si_3O_{10}$-$2H_2O$, the formula for natrolite. Naturally-occurring mineral zeolites include amicite, analcime, barrerite, bellbergite, bikitaite, boggsite, brewsterite, chabazite, clinoptilolite, cowlesite, dachiardite, edingtonite, epistilbite, erionite, faujasite, ferrierite, garronite, gismondine, gmelinite, gobbinsite, gonnardite, goosecreekite, harmotome, herschelite, heulandite, laumontite, levyne, maricopaite, mazzite, merlinoite, mesolite, montesommaite, mordenite, natrolite, offretite, paranatrolite, paulingite, pentasil (also known as zsm-5), perlialite, phillipsite, pollucite, scolecite, sodium dachiardite, stellerite, stilbite, tetranatrolite, thomsonite, tschernichite, wairakite, wellsite, willhendersonite, and yugawaralite.

There are several types of synthetic zeolites that form by a process of slow crystallization of a silica-alumina gel in the presence of alkalis and organic templates. The product properties depend on reaction mixture composition, pH of the system, operating temperature, pre-reaction 'seeding' time, reaction time as well as the templates used. Preparation of synthetic zeolites suitable for use in embodiments of the invention is shown, for example, in U.S. Pat. No. 4,661,334, to Latounnette, et al. ("Preparation of Zeolites 4A and/or 13X"); U.S. Pat. No. 4,649,036 to Pastorello, et al. ("Process for the Manufacture of Zeolites 4A . . . "); U.S. Pat. No. 5,487,882 to Hu, et al. ("Process for Preparation of Zeolite 'X'"); U.S. Pat. No. 6,258,768, to Araya ("Zeolite P . . . "); and U.S. Pat. No. 4,264,562, to Kostinko ("Method of Producing Zeolite Y").

Synthetic zeolites hold some key advantages over their natural analogs. The synthetics can, of course, be manufactured in a uniform, phase-pure state. It is also possible to manufacture desirable zeolite structures which do not appear in nature. Zeolite A is a well-known example. Examples of synthetic zeolites are the A, P, X and/or Y types. One example of a type A zeolite has the chemical formula $Na_2O:2SiO_2$: $Al_2O_3:3.94H_2O$, wherein the quantity of $Na_2O$ is 17%, $Al_2O_3$ is 29%, $SiO_2$ is 34% and $H_2O$ is 20%. U.S. Pat. No. 4,264,562, to Kostinko gives a description of different synthetic zeolite types.

The general formula for zeolites can be expressed by $Na_2O:\chi SiO_2:Al_2O_3:\gamma H_2O$. Zeolite X will have $\chi=2.5\pm0.5$, Zeolite A will have $\chi=1.85\pm0.5$, Zeolite Y will have $\chi=4.5\pm1.5$. U.S. Pat. No. 6,258,768 (Arraya) describes the typical formula for Zeolite P where $\chi$ will vary from 1.80 up to 2.66. The water content on the structure, represented by $\gamma$ is variable and can reach up to 9. Typical values of $\gamma$ for Zeolite X are 6.2 and Zeolite A is 3.91. In some embodiments the value of $\gamma$ is in a range of 3 to 9 for synthetic grades. Natural grades are typically 2. For example, natrolite has the formula of $Na_2Al_2Si_3O_{10}.2H_2O$.

Advantages of Adding Zeolite into RAP/RAS

Preparation of a RAP/RAS and zeolite mixture may have a number of advantages over traditional methods. A number of possible advantages are set forth below:

1) A single RAS or RAP zeolite mixture plant usually supports numerous asphalt production plants. Individual asphalt plants would not have to install equipment to dose zeolite and be able to operate at lower temperatures with increased RAP or RAS percentages. Only the RAS or RAP producer would have to install the zeolite dosing equipment.

2) Because if its unique feature of releasing micro steam bubbles from its structure, providing a lubrication effect on the asphalt cement and asphalt mix, zeolite keeps the RAS/RAP modified asphalt mix workable longer. This will allow the asphalt manufacturer to add more RAS/RAP into the mix than is normally possible with regular asphalt.

3) Even at if the same RAS/RAP level is added (without taking advantage of the additional RAS/RAP that may be included because of use of the zeolite), the asphalt mix can be produced at lower temperatures. This leads to energy savings and lower emissions on the asphalt production plant.

4) RAS has 15-35% asphalt cement (or bitumen) content. Processed RAS sells for about $40-70/ton. Virgin asphalt cement is significantly more expensive (currently at $600/ton and virgin aggregate is approx $10-20/ton). Use of the RAS/zeolite mixture provides significant cost savings.

5) RAP has 3-7% asphalt cement (or bitumen) content. Processed RAP costs a asphalt production plant approx $6/ton. Virgin asphalt cement is significantly more expensive (currently at $600/ton and virgin aggregate is approx $10-20/ton). Again, significant cost savings with a RAP/zeolite mixture may be realized.

6) Typically the RAS/RAP surface gets hot enough to melt the surface of the ground RAS/RAP during processing by the mill. This slows production down and requires large amounts of RAS/RAP to be processed twice. Zeolite is a flow aid and should bond to the melted surface before the milled RAP/RAS particle has a chance to agglomerate. This should allow the RAP/RAS producer to process RAP/RAS faster.

7) RAP/RAS storage is more straightforward with zeolite mixture. During storage the surface of the particles may get hot enough to melt; if a large pile of RAP/RAS is present the weight of the pile with the elevated temperatures could cause the pile to bond together. With zeolite present the material should not agglomerate due to heat. This will permit larger inventory piles of processed recycled materials thereby smoothing out the processing schedule of the recycler and allowing adequate inventory to cover peak instantaneous demand.

8) Stiff mixtures with RAS: Hardness of the asphalt in roofing shingles tends to make a stiffer paving mixture. This stiffness could be problematic in cold climates. The use of zeolite as a warm mix asphalt agent will allow the increase on RAS % into the mix and will result on a less stiff mixture during placement on the road and hand-work.

9) Zeolite can be used to treat existing stockpiles of RAS or RAP. By using traditional blending techniques the introduction of zeolite will improve already stored RAS or RAP by absorbing residual water on the stock pile and eliminating the clumps that can cause problems when fed to the asphalt plant.

RAP typically has a bitumen content of 3-7% and RAS typically has a bitumen content from 15-35%. Generally a higher quantity of RAP can be recycled, as much as 50% of the mix. With RAS, because of the higher bitumen content the recycling is not as high as RAP, with a limit on around 10%, depending on the percentage of bitumen in the RAS.

The binder contained in RAS is significantly stiffer than paving grade binders. This is because a stiffer binder is needed to prevent the material from creeping under its own weight when placed on a sloped roof. As with paving asphalt grades, roofing grade asphalt varies in stiffness according to climate with stiffer asphalt being used in warmer climates. The main concern when using RAS in asphalt mixes is the effect on the cold-temperature performance of the mix because of the stiffness of the asphalt binder in shingles. However, a number of recent studies of performance graded (PG) binder properties recovered from laboratory and plant produced mixes have shown that while there is a stiffening in RAS mixes at cold temperatures, it is usually not significant. When used at percentages where the amount of virgin binder in the mix is 60-70%, no change in binder grade is normally required. The stiff asphalt binder in RAS improves rutting resistance, but does not appreciably affect the low-temperature properties of the mix.

Those of skill in the art will recognize that an asphalt mix is typically a mixture of aggregate, asphalt cement, and one or more additives. Asphalt mix is typically the direct precursor to a finished asphalt product, such as a road.

MIXTURES OF RAS AND ZEOLITE

One embodiment of the invention provides mixtures of RAS and zeolite. Generally when RAS is processed, shingles must be shredded or ground to be used successfully for virtually any road application. For hot mix asphalt (HMA) and cold patch, generally the smaller the shreds, the better they will be incorporated into the mix. In these applications, the shingle pieces must be smaller than ½", and preferably smaller than ¼" to comply with existing state regulations. Specifications written for the Texas Department of Transportation require that 100% of the shingle shreds pass the 19 mm (¾") sieve, and 95% pass the 12.5 mm (½") sieve. The Georgia DOT requires that 100% of the shingle scrap pass the 12.5 mm sieve. Guidance from the FHWA (Federal Highway Administration) also recommends shreds sized less than ½".

Crushers, hammer mills, and rotary shredders have been used with various success to process waste shingles. Often the shingles are passed through the processing equipment twice for size reduction.

Tear-off roofing is easier to shred than factory scrap. Factory scrap tends to become plastic from the heat and mechanical action of the shredding process. Tear-off roofing is hardened with age and is less likely to agglomerate during processing.

Water is sometimes added during shredding to both keep the shingles cool and to limit dust, but obviously the added moisture is undesirable in producing HMA. Alternatively, the shreds may be blended with up to 20% sand or screenings that would otherwise be added later in the production of the HMA or cold mix asphalt patching material. The roofing shingle shreds may also be mixed with recycled asphalt pavement (RAP) to prevent clumping of the stockpile.

Tear-off roofing is much more variable in composition than factory scrap, and is more contaminated with debris which complicates processing. Nail removal is accomplished by magnets after shredding. Paper and lightweight contaminants may be removed by blowers or vacuums.

The zeolite may be added at one or more times during the processing of the RAS, providing different advantages depending on when it is added. Various places in the production of RAS where zeolite may be added are detailed in FIG. 1. Zeolite can be added before or after the milling step of RAS. The addition of zeolite can be done in a slurry form before the milling operation, replacing the water used in those processes to control temperature and dust. Zeolite can also be added in powder form before or after the milling operation, maintaining the water sprays to control dust and temperature.

Zeolite can be added after the milling operation in a powder form, where it will be mixed with the RAS in the stock pile providing good flow properties and less clumping potential. Zeolite can be added before the final screening operation in a powder form, where it will be mixed with the RAS during the screening process, providing a post screened product with good flow properties and less clumping potential.

RAS can also be used to modify the powder flowing characteristics of the zeolite. For those skilled in the art the addition of powder zeolite into asphalt mix plant requires specific equipment. As an example of a dedicated zeolite dosing equipment may constitute of a bin hopper with a volumetric or gravimetric auger and an air blowing system to the asphalt drum. The blend of large quantities of zeolite and RAS allows the final product to be added through the existing RAS system already installed in the asphalt mix plants. This system is generally composed by a storage bin and a weigh cell conveyor. Those type of systems work very well with more granular material and are known not to work well with powders. The addition of zeolite to RAS or RAP does not alter their original granularity and improves the flowability. The zeolite powder will cover the RAS (or RAP) particle making a nice barrier for moisture ingress and agglomeration.

Zeolite powder may be added to RAS using traditional blend equipment. The blend equipment could include, but is not limited to, rotary mixers or cold bin feeders that will promote the contact with zeolite and RAS in such a way that the zeolite powder is incorporated with the RAS particles.

The temperatures achieved during the milling of RAS are in the range of 50-70° C., which will facilitate the bonding of the zeolite particle to the RAS particle. This creates a product much less likely to be affected by weather conditions (for example, rain) when stored outside.

MIXTURES OF RAP AND ZEOLITE

Reclaimed asphalt pavement must be processed into a granular material prior to use in hot mix applications. The processed RAP used in recycled hot mix asphalt should be as coarse as possible and the fines (minus 0.075 mm (No. 200 sieve)) minimized. Gentle RAP crushing (controlled crusher speed and clearance adjustment on exit gate) is recommended to minimize the fracture of coarse aggregate and excess fines generation. Various points in the production of RAP where zeolite may be added are shown in FIG. 2.

A typical RAP processing plant consists of a crusher, screening units, conveyors, and stacker. It is desirable to produce either a coarse or a fine fraction of processed RAP to permit better control over input to the hot mix plant and better control of the mix design. The processed RAP used in recycled hot mix asphalt should be as coarse as possible and the fines (minus 0.075 mm (No. 200 sieve)) minimized. Gentle RAP crushing (controlled crusher speed and clearance adjustment on exit gate) is recommended to minimize the fracture of coarse aggregate and excess fines generation.

Zeolite can be added during the milling process of RAP. As with RAS milling, addition of the zeolite during RAP milling may be timed to provide the greatest processing advantage. Zeolite added during RAP milling will be mainly in powder form, since normally water is not involved in RAP milling operations. RAP will typically be milled more coarsely than the RAS, so the heat of the fines is not great and the zeolite is less likely to bond with RAP than with RAS. Zeolite can also be added on the conveyor that transport the final milled RAP (with the different gradations properly mixed) to the asphalt production plant drum or batch process. Zeolite would be mixed with the RAP in the conveyor and incorporate in the asphalt mix when entering the drum or batch process.

RAP can also be used to modify the powder flowing characteristics of the zeolite. For those skilled in the art the addition of powder zeolite into asphalt mix plant requires specific equipment. As an example of a dedicated zeolite dosing equipment may include a bin hopper with a volumetric or gravimetric auger and an air blowing system to the asphalt drum. The blend of large quantities of zeolite and RAP allows the final product to be added through the existing RAP system already installed in the asphalt mix plants. This system is generally composed by a storage bin and a weigh cell conveyor. Those type of systems work very well with more granular material and are known not to work well with powders.

Although various embodiments and examples have been discussed in the context of zeolite/RAS mixtures and zeolite/RAP mixtures, those skilled in the art will recognize with the benefit of this disclosure that a mixture of zeolite, RAS, and RAP may also be beneficial. In such a case it would be likely that two separate open storage bins would be kept, one with a RAP/zeolite mixture and one with a RAS/zeolite mixture. These would then be pre-mixed before addition at the plant. Of course, the RAS, RAP, and zeolite may be stored in a single bin, but doing so could potentially reduce the flexibility of available mixture amounts.

Zeolite powder may be added to RAP using traditional blend equipment. The blend equipment could include, but is not limited to, rotary mixers or cold bin feeders that will promote the contact with zeolite and RAP in such a way that the zeolite powder is incorporated with the RAP particles. The zeolite blend with RAS or RAP may be stored on an outside pile or loaded into super sacks. If an asphalt mix plant has a forklift available the super sacks can be unloaded into their RAP or RAS open bin and fed directly to the mix plant. If the asphalt mix plant does not have a forklift available then bulk delivery is preferred. This allows a front end loader to feed the open bin.

Although RAS or RAP equipment is used in this case, the main driver for the adequate dosing is the zeolite portion. If a 2.5 Kg of zeolite per ton of asphalt dosing rate needs to be added to the asphalt mix plant and a blend of 50% zeolite and 50% RAS is used the rate of addition of the blended material will be 5.0 Kg per ton of asphalt. In this case the mix plant operator will be able to account for the benefits of the extra 2.5 Kg of RAS or RAP entering the process. For example, this may allow the operator to extend the use of bitumen.

EXAMPLES

Certain aspects of the invention will become apparent through review of the example presented below.

Example 1

Example 1 reports the production of a zeolite/RAS mixture. Zeolite is added to the "fresh RAS" before entering the milling process or just after leaving the milling process. The quantity of zeolite to be added to fresh RAS is defined by the target percentage of RAS to be used in the asphalt mix and the target percentage of zeolite to be used in the asphalt mix to enable an asphalt production plant to run at lower temperatures. If a target of 2.5 Kg of zeolite per Ton of asphalt mix is to be added and a target of 5% RAS will be recycled per Ton of asphalt mix the quantity of zeolite to be added to the RAS will be 2.5 Kg for each 50 Kgs of RAS processed. The mixture of RAS and zeolite is milled and with heat from the grinder and zeolite bonds with the RAS. Milled particles pass on a screening system where product is separated and oversize particles return to the milling process.

The zeolite/RAS mixture is transferred to the asphalt production plant. Typically it is stored in piles in an open area. The asphalt mix design will call for a certain percentage of RAS to be used depending on the quality of the RAS and the desired properties of the end product. For example, this mix may be a 5% RAS into the final asphalt composition.

RAS is taken from the pile with a front end loader and discharged into an open storage bin. The open storage bin has a weight device system to adjust the RAS flow to be added into the mix, according to asphalt production and percentage (by weight) of RAS into the asphalt mix.

Asphalt is prepared by heating up the aggregates to eliminate all residual humidity. The aggregates have a specific gradation according to the mix design and can vary on size and percentages. Normally three or four different types of aggregates are used on a mix design. Coarse, medium and fine aggregates may be used depending on the type of mix one wants to produce. For example if one wants to have a surface finishing mix the amount of fines are higher to give a more uniform appearance.

Hot aggregates are mixed with fresh asphalt cement and RAS. There are two types of processes typically used to make asphalt mixes. They are called a "continuous drum" process (an example of which is shown in FIG. 3) or "batch" process (an example of which is shown in FIG. 4). RAS is added on hot aggregate so the asphalt cement in the RAS can heat up and become soft, allowing it to reincorporate into fresh aggregate.

The addition of zeolite allows the asphalt production plant to reduce its operating temperature from an average of 320° F. (160° C.) to 250° F. (121° C.), because of the effect of release of micro water steam bubbles from the zeolite structure when heated at this temperature. Upon heating above 212° F. (100° C.), water will be emitted from the zeolite structure causing micro-foaming in the asphalt concrete. Typically an asphalt production plant using zeolite addition may be operated in a temperature range between 250° F. (121° C.) to 320° F. (160° C.), The use of zeolites in the upper range of temperature is for when one wishes to achieve an improvement on compaction and workability and not necessarily run warm mix typical processing temperatures.

The point of addition of zeolite should be as close as possible to the addition of bitumen so the water release from its structure will effectively act to cause micro-foaming of the bitumen. If zeolite is added when starting to heat the aggregates, the water will be released before it gets into contact with bitumen.

Similar to addition of zeolite alone, RAS is typically added as close as possible to the bitumen. That allows the softening of old bitumen to promote the re incorporation into the mix.

Exemplary mixtures of RAS and zeolite are shown in Tables 1-5, below, which show amounts of RAS and zeolite used for base 1 ton mixtures of asphalt and zeolite. Tables 1-4 and 6 tables also show exemplary mixtures of RAP and zeolite, which will be discussed below.

Based on percentage of zeolite included in the mix, different properties are anticipated. At relatively high amounts of zeolite (for example, at amounts greater than 1.5 Kg zeolite per ton of mix), multiple benefits are achieved. The RAS/zeolite mixture will have improved compaction, will lower the temperature at which the asphalt mix takes place, and will provide a product with enhanced workability. These effects would be likely to increase with additional zeolite, though of course the benefits would not continue to increase indefinitely, and at some level of zeolite the use in asphalt mixture could be undesirable for other reasons. The effects of addition of zeolite over the limit of 3 Kg per Ton of mix are not completely known, however it was observed that too much zeolite we can cause tenderness to the mix. Tenderness results in additional shoving and reduction of densities during placement; tender asphalt mixes are typically difficult to compact during production.

TABLE 1

Base 1 Ton of Mix Asphalt and 2.5 Kg Zeolite

| % RAS added to the mix | Kg of RAS added to the mix | % Zeolite added to the mix | Kg of Zeolite added to the mix | Kg Zeolite added per Ton of RAS |
| --- | --- | --- | --- | --- |
| 3% | 30 | 0.25% | 2.5 | 83 |
| 4% | 40 | 0.25% | 2.5 | 63 |
| 5% | 50 | 0.25% | 2.5 | 50 |
| 6% | 60 | 0.25% | 2.5 | 42 |
| 7% | 70 | 0.25% | 2.5 | 36 |
| 8% | 80 | 0.25% | 2.5 | 31 |
| 9% | 90 | 0.25% | 2.5 | 28 |
| 10% | 100 | 0.25% | 2.5 | 25 |

| % RAP added to the mix | Kg of RAP added to the mix | % Zeolite added to the mix | Kg of Zeolite added to the mix | Kg Zeolite added per Ton of RAP |
| --- | --- | --- | --- | --- |
| 5% | 50 | 0.25% | 2.5 | 50 |
| 10% | 100 | 0.25% | 2.5 | 25 |
| 15% | 150 | 0.25% | 2.5 | 17 |
| 20% | 200 | 0.25% | 2.5 | 13 |
| 25% | 250 | 0.25% | 2.5 | 10 |
| 30% | 300 | 0.25% | 2.5 | 8.3 |
| 35% | 350 | 0.25% | 2.5 | 7.1 |
| 40% | 400 | 0.25% | 2.5 | 6.3 |
| 45% | 450 | 0.25% | 2.5 | 5.6 |
| 50% | 500 | 0.25% | 2.5 | 5.0 |

TABLE 2

Base 1 Ton of Mix Asphalt and 2 Kg Zeolite

| % RAS added to the mix | Kg of RAS added to the mix | % Zeolite added to the mix | Kg of Zeolite added to the mix | Kg Zeolite added per Ton of RAS |
| --- | --- | --- | --- | --- |
| 3% | 30 | 0.20% | 2 | 67 |
| 4% | 40 | 0.20% | 2 | 50 |
| 5% | 50 | 0.20% | 2 | 40 |
| 6% | 60 | 0.20% | 2 | 33 |
| 7% | 70 | 0.20% | 2 | 29 |
| 8% | 80 | 0.20% | 2 | 25 |
| 9% | 90 | 0.20% | 2 | 22 |
| 10% | 100 | 0.20% | 2 | 20 |

| % RAP added to the mix | Kg of RAP added to the mix | % Zeolite added to the mix | Kg of Zeolite added to the mix | Kg Zeolite added per Ton of RAP |
| --- | --- | --- | --- | --- |
| 5% | 50 | 0.20% | 2 | 40 |
| 10% | 100 | 0.20% | 2 | 20 |
| 15% | 150 | 0.20% | 2 | 13 |
| 20% | 200 | 0.20% | 2 | 10 |
| 25% | 250 | 0.20% | 2 | 8.0 |
| 30% | 300 | 0.20% | 2 | 6.7 |
| 35% | 350 | 0.20% | 2 | 5.7 |
| 40% | 400 | 0.20% | 2 | 5.0 |
| 45% | 450 | 0.20% | 2 | 4.4 |
| 50% | 500 | 0.20% | 2 | 4.0 |

TABLE 3

Base 1 Ton of Mix Asphalt and 1.5 Kg Zeolite

| % RAS added to the mix | Kg of RAS added to the mix | % Zeolite added to the mix | Kg of Zeolite added to the mix | Kg Zeolite added per Ton of RAS |
| --- | --- | --- | --- | --- |
| 3% | 30 | 0.15% | 1.5 | 50 |
| 4% | 40 | 0.15% | 1.5 | 38 |
| 5% | 50 | 0.15% | 1.5 | 30 |
| 6% | 60 | 0.15% | 1.5 | 25 |
| 7% | 70 | 0.15% | 1.5 | 21 |

TABLE 3-continued

Base 1 Ton of Mix Asphalt and 1.5 Kg Zeolite

| 8% | 80 | 0.15% | 1.5 | 19 |
| 9% | 90 | 0.15% | 1.5 | 17 |
| 10% | 100 | 0.15% | 1.5 | 15 |

| % RAP added to the mix | Kg of RAP added to the mix | % Zeolite added to the mix | Kg of Zeolite added to the mix | Kg Zeolite added per Ton of RAP |
| --- | --- | --- | --- | --- |
| 5% | 50 | 0.15% | 1.5 | 30 |
| 10% | 100 | 0.15% | 1.5 | 15 |
| 15% | 150 | 0.15% | 1.5 | 10 |
| 20% | 200 | 0.15% | 1.5 | 7.5 |
| 25% | 250 | 0.15% | 1.5 | 6.0 |
| 30% | 300 | 0.15% | 1.5 | 5.0 |
| 35% | 350 | 0.15% | 1.5 | 4.3 |
| 40% | 400 | 0.15% | 1.5 | 3.8 |
| 45% | 450 | 0.15% | 1.5 | 3.3 |
| 50% | 500 | 0.15% | 1.5 | 3.0 |

TABLE 4

Base 1 Ton of Mix Asphalt and 1 Kg Zeolite

| % RAS added to the mix | Kg of RAS added to the mix | % Zeolite added to the mix | Kg of Zeolite added to the mix | Kg Zeolite added per Ton of RAS |
| --- | --- | --- | --- | --- |
| 3% | 30 | 0.10% | 1 | 33 |
| 4% | 40 | 0.10% | 1 | 25 |
| 5% | 50 | 0.10% | 1 | 20 |
| 6% | 60 | 0.10% | 1 | 17 |
| 7% | 70 | 0.10% | 1 | 14 |
| 8% | 80 | 0.10% | 1 | 13 |
| 9% | 90 | 0.10% | 1 | 11 |
| 10% | 100 | 0.10% | 1 | 10 |

| % RAP added to the mix | Kg of RAP added to the mix | % Zeolite added to the mix | Kg of Zeolite added to the mix | Kg Zeolite added per Ton of RAP |
| --- | --- | --- | --- | --- |
| 5% | 50 | 0.10% | 1 | 20 |
| 10% | 100 | 0.10% | 1 | 10 |
| 15% | 150 | 0.10% | 1 | 6.7 |
| 20% | 200 | 0.10% | 1 | 5.0 |
| 25% | 250 | 0.10% | 1 | 4.0 |
| 30% | 300 | 0.10% | 1 | 3.3 |
| 35% | 350 | 0.10% | 1 | 2.9 |
| 40% | 400 | 0.10% | 1 | 2.5 |
| 45% | 450 | 0.10% | 1 | 2.2 |
| 50% | 500 | 0.10% | 1 | 2.0 |

TABLE 5

Blends of Zeolite and RAS

| % Zeolite in weight | % RAS in weight | % Total in weight |
| --- | --- | --- |
| 5% | 95% | 100% |
| 10% | 90% | 100% |
| 15% | 85% | 100% |
| 20% | 80% | 100% |
| 25% | 75% | 100% |
| 30% | 70% | 100% |
| 35% | 65% | 100% |
| 40% | 60% | 100% |
| 45% | 55% | 100% |
| 50% | 50% | 100% |
| 55% | 45% | 100% |
| 60% | 40% | 100% |
| 65% | 35% | 100% |
| 70% | 30% | 100% |
| 75% | 25% | 100% |
| 80% | 20% | 100% |
| 85% | 15% | 100% |
| 90% | 10% | 100% |
| 95% | 5% | 100% |

TABLE 6

Blends of Zeolite and RAP

| % Zeolite in weight | % RAP in weight | % Total in weight |
| --- | --- | --- |
| 5% | 95% | 100% |
| 10% | 90% | 100% |
| 15% | 85% | 100% |
| 20% | 80% | 100% |
| 25% | 75% | 100% |
| 30% | 70% | 100% |
| 35% | 65% | 100% |
| 40% | 60% | 100% |
| 45% | 55% | 100% |
| 50% | 50% | 100% |
| 55% | 45% | 100% |
| 60% | 40% | 100% |
| 65% | 35% | 100% |
| 70% | 30% | 100% |
| 75% | 25% | 100% |
| 80% | 20% | 100% |
| 85% | 15% | 100% |
| 90% | 10% | 100% |
| 95% | 5% | 100% |

As the amount of zeolite per ton of mix decreases, we expect that the improved compaction effects will persist, as will the increased workability of the asphalt product in the drum. However, we anticipate that at low levels of zeolite the temperature-decreasing effects will not be appreciable.

Example 2

Example 2 reports production of a RAP/zeolite mixture. For this example, all conditions and processes of Example 1 are followed, with the exception that a greater amount of RAP is necessary than is required for the RAS mixture. This is because the RAP has a lower amount of asphalt than the RAS. This difference is reflected in the Tables presented above.

Patents, patent applications, publications, scientific articles, books, web sites, and other documents and materials referenced or mentioned herein are indicative of the levels of skill of those skilled in the art to which the inventions pertain, as of the date each publication was written, and all are incorporated by reference as if fully rewritten herein. Inclusion of a document in this specification is not an admission that the document represents prior invention or is prior art for any purpose.

We claim:

1. An asphalt mix additive comprising:
   a zeolite in an amount between 0.01% and 0.5% by weight per ton of asphalt mix; and
   recycled asphalt shingles in an amount between 0.5% and 50% by weight per ton of asphalt mix.
2. The asphalt mix additive of claim 1, wherein said zeolite is selected from the group consisting of amicite, analcime, barrerite, bellbergite, bikitaite, boggsite, brewsterite, chabazite, clinoptilolite, cowlesite, dachiardite, edingtonite, epistilbite, erionite, faujasite, ferrierite, garronite, gismondine, gmelinite, gobbinsite, gonnardite, goosecreekite, harmotome, herschelite, heulandite, laumontite, levyne, maricopaite, mazzite, merlinoite, mesolite, montesommaite, mordenite, natrolite, offretite, paranatrolite, paulingite, pentasil (also known as zsm-5), perlialite, phillipsite, pollucite, scolecite, sodium dachiardite, stellerite, stilbite, tetranatrolite, thomsonite, tschernichite, wairakite, wellsite, willhendersonite, yugawaralite, zeolite A, zeolite X, zeolite P, zeolite Y, zeolite 4A, zeolite 13X, and mixtures thereof.

3. The asphalt mix additive of claim 1, wherein said zeolite is Zeolite A.

4. The asphalt mix additive of claim 1, wherein said zeolite contains water in an amount between 5 and 35% by weight of the zeolite.

5. The asphalt mix additive of claim 1, wherein said recycled asphalt shingles are organic recycled asphalt shingles comprising, by weight, 30-50% asphalt cement, 5-15% felt, 10-20% mineral filler, and 30-50% mineral granules.

6. The asphalt mix additive of claim 1, wherein said recycled asphalt shingles are fiberglass shingles comprising, by weight, 15-50% asphalt cement, 5-15% felt, 15-20% mineral filler, and 30-50% mineral granules.

7. An asphalt mix additive comprising:
  a zeolite in an amount between 0.01% and 0.5% by weight per ton of asphalt mix; and
  reclaimed asphalt pavement in an amount between 5% and 90% by weight per ton of asphalt mix.

8. The asphalt mix additive of claim 7, wherein said zeolite is selected from the group consisting of amicite, analcime, barrerite, bellbergite, bikitaite, boggsite, brewsterite, chabazite, clinoptilolite, cowlesite, dachiardite, edingtonite, epistilbite, erionite, faujasite, ferrierite, garronite, gismondine, gmelinite, gobbinsite, gonnardite, goosecreekite, harmotome, herschelite, heulandite, laumontite, levyne, maricopaite, mazzite, merlinoite, mesolite, montesommaite, mordenite, natrolite, offretite, paranatrolite, paulingite, pentasil (also known as zsm-5), perlialite, phillipsite, pollucite, scolecite, sodium dachiardite, stellerite, stilbite, tetranatrolite, thomsonite, tschernichite, wairakite, wellsite, willhendersonite, yugawaralite, zeolite A, zeolite X, zeolite P, zeolite Y, zeolite 4A, zeolite 13X, and mixtures thereof.

9. The asphalt mix additive of claim 7, wherein said zeolite is Zeolite A.

10. The asphalt mix additive of claim 7, wherein said zeolite contains water in an amount between 5 and 35% by weight of the zeolite.

11. The asphalt mix additive of claim 7, wherein said reclaimed asphalt pavement comprises 93-97% mineral aggregate and 3-7% asphalt cement.

12. An asphalt mix additive comprising:
  a zeolite;
  recycled asphalt shingles; and
  sand.

13. The asphalt mix additive of claim 12, wherein said zeolite is selected from the group consisting of amicite, analcime, barrerite, bellbergite, bikitaite, boggsite, brewsterite, chabazite, clinoptilolite, cowlesite, dachiardite, edingtonite, epistilbite, erionite, faujasite, ferrierite, garronite, gismondine, gmelinite, gobbinsite, gonnardite, goosecreekite, harmotome, herschelite, heulandite, laumontite, levyne, maricopaite, mazzite, merlinoite, mesolite, montesommaite, mordenite, natrolite, offretite, paranatrolite, paulingite, pentasil (also known as zsm-5), perlialite, phillipsite, pollucite, scolecite, sodium dachiardite, stellerite, stilbite, tetranatrolite, thomsonite, tschernichite, wairakite, wellsite, willhendersonite, yugawaralite, zeolite A, zeolite X, zeolite P, zeolite Y, zeolite 4A, zeolite 13X, and mixtures thereof.

14. The asphalt mix additive of claim 12, wherein said zeolite is Zeolite A.

15. The asphalt mix additive of claim 12, wherein said zeolite contains water in an amount between 5 and 35% by weight of the zeolite.

16. The asphalt mix additive of claim 12, wherein said recycled asphalt shingles are organic recycled asphalt shingles comprising, by weight, 30-50% asphalt cement, 5-15% felt, 10-20% mineral filler, and 30-50% mineral granules.

17. The asphalt mix additive of claim 12, wherein said recycled asphalt shingles are fiberglass shingles comprising, by weight, 15-50% asphalt cement, 5-15% felt, 15-20% mineral filler, and 30-50% mineral granules.

* * * * *